United States Patent [19]

Munari et al.

[11] 4,188,354

[45] Feb. 12, 1980

[54] METHOD FOR THE PREPARATION OF ASYMMETRICAL MEMBRANES

[75] Inventors: Stelio Munari; Fernando Vigo; Gustavo Capannelli; Claudio Uliana; Aldo Bottino, all of Genoa, Italy

[73] Assignee: Tecneco S.p.A., Fano, Italy

[21] Appl. No.: 820,322

[22] Filed: Jul. 29, 1977

[30] Foreign Application Priority Data

Aug. 5, 1976 [IT] Italy ............... 12746 A/76
Oct. 27, 1976 [IT] Italy ............... 12862 A/76

[51] Int. Cl.$^2$ ............................................. B29D 27/04
[52] U.S. Cl. ............................... 264/22; 204/159.17; 204/159.18; 204/159.2; 210/23 F; 210/23 H; 264/41; 264/232; 264/331; 525/331
[58] Field of Search ............... 264/41, 331, 22, 232; 210/23 H, 23 F; 260/884; 204/159.17, 159.18, 159.2

[56] References Cited

U.S. PATENT DOCUMENTS

| 3,642,668 | 2/1972 | Bailey et al. ............... 264/331 X |
| 3,808,303 | 4/1974 | Ganci et al. ............... 264/41 |
| 3,808,305 | 4/1974 | Gregor ............... 264/41 X |
| 3,846,521 | 11/1974 | Osterholtz ............... 264/22 |
| 3,847,652 | 11/1974 | Fletcher et al. ............... 264/22 X |
| 3,904,519 | 9/1975 | McKinney et al. ............... 210/23 H |
| 3,954,607 | 5/1976 | Halling ............... 210/23 H |
| 3,992,495 | 11/1976 | Sano et al. ............... 264/22 |
| 4,005,012 | 1/1977 | Wrasidlo ............... 210/23 H |
| 4,012,324 | 3/1977 | Gregor ............... 210/23 H |
| 4,046,843 | 9/1977 | Sano et al. ............... 264/22 |
| 4,107,049 | 8/1978 | Sano et al. ............... 264/22 X |

Primary Examiner—Philip Anderson
Attorney, Agent, or Firm—Morgan, Finnegan, Pine, Foley & Lee

[57] ABSTRACT

Asymmetric membranes for osmosis and ultrafiltration are prepared from fluorinated polymers which are dissolved in one or more solvents, cast on a plate, allowed to evaporate and precipitated with a nonsolvent. The polymeric material can variously be modified by chemical reactions, irradiations or both. By varying the chemical and physical parameters of the preparation run, a variety of membranes can be obtained which have the most varied performances and properties.

2 Claims, No Drawings

METHOD FOR THE PREPARATION OF ASYMMETRICAL MEMBRANES

This invention relates to a method for the preparation of asymmetric membranes of any shape, as obtained from modified fluorinated polymers and which are adapted to the application to reverse osmosis and ultrafiltration processes or, anyhow, processes of separation of dissolved substances from their solvents and vice versa, by the action of a pressure.

As is known, e.g. from U.S. Pat. Nos. 3,133,132 and 3,344,214, a process has been developed long since, according to which it is possible to obtain, from polymers which are soluble in a certain solvent, by gelation or casting, asymmetric membranes which can be used in separation processes.

As far as the separation of substances which are either dissolved or dispersed in water is concerned, the polymers which lend themselves best to be converted into asymmetric membranes by such processes are substantially the following: cellulose acetate, polyamides and a few other derivatives which contain nitrogeneous groups and also polysulfones and polyethers.

An object of the present invention is to provide asymmetric membranes starting from polymers which contain fluorinated groups and thus have a high resistance to chemicals, heat and bacteria, and which have been properly modified so as to render them chemically similar to the liquid by which they must be permeated. Such polymers, therefore, must have the following properties:

1. They should contain F groups (not less than 2% by weight);
2. They should be readily soluble in an appropriate solvent;
3. They should contain in their chain, atoms capable of reacting chemically and/or by irradiation.

The membranes prepared therewith must have the following properties:

1. They should have asymmetric structure, that is, a structure composed by a denser thin layer and by a spongy layer intended to act as a supporting member;
2. They must contain chemical groups having an affinity towards the liquid which must permeate the membrane (such as $SO_3$ groups for water and so on);
3. They should have a high stability to chemicals, heat, bacteria and a high mechanical resistance.

More detailedly, the membranes referred to above are obtained by the following procedure: the polymer, which has been properly selected, is dissolved in a solvent in proportions which vary between 4% and 80% in terms of weight per volume of solvent. To the solution, if necessary, a second solvent is added, which has a vapor pressure different from that of the previous solvent, in a proportion which varies from 0.2 to 5 times the original volume of the solution.

The final solution is then spread, by means of a doctor blade, on a perfectly smooth glass or metal plate which has on its edges two appropriate shims, the thickness of which ranges from 10 to 1,000 microns.

The spread solution is then allowed to evaporate for a time which is dictated by experience and which varies from 0 to 60 minutes and at a temperature comprised between −20° C. and +100° C. consistently with the properties which are expected for the membrane. The plate assembly is then immersed in a solution at different temperatures according to necessity (for example water and ice during 1 hour and then tap water at 20° C. for a time as dictated by the expected properties for the membrane (from 1 hour to 15 days).

The polymer which is required for preparing the solution referred to above, according to a first feature of the present invention, can be modified in the initial step, prior to being used for making the starting solutions for the preparation of the membranes.

According to an alternative embodiment, which is within the scope of this invention, it is possible to effect the above suggested modification after having completed the preparation of the membrane. In this case, as it is apparent, the modification could also be such as not to involve the entire polymer mass.

In either case, as the preparation has been completed, the membrane is ready for being used in a reverse osmosis plant and ultrafiltration plant, provided that care is taken always to place the denser surface of the membrane on the side of the solution to be separated.

The modification outlined above can be obtained both by chemical and physical procedures.

In the case in which it has been chosen to modify the polymer beforehand, the latter is caused to react, in the solution condition, or suspension, or emulsion, powder or granules, both in a heterogeneous or homogeneous phase, with compounds which are capable of introducing the appropriate functional groups in the polymer.

The polymers which can be used in the method according to this invention are: polyvinyl fluoride, polyvinylidene fluoride, polytrifluoroethylene, poly-1,1,2-trifluorobutadiene, polyvinylsulphofluoride, tetrafluoroethylene-ethylene copolymers and tetrafluoroethylene-vinylidene fluoride copolymers and in general all those copolymers which contain C, H, F and such groups (as halogens, sulphone and others) as are capable of undergoing, under the appropriate conditions, a chemical and radiochemical reaction with other chemical compounds.

The solvents which can be used are all those solvents which are water-miscible or water-immiscible and which can subsequently be extracted from the polymer, such as dimethylformamide, dimethylsulphoxide, tetrahydrofuran, formamide, acetone and other ketones, ethyl acetate, dimethylacetamide, dioxan, pyridines, triethyl phosphate and hexamethylphosphoramide.

The agents which can be used for modifying the polymer are all those organic or inorganic compounds which are capable of being chemically or radiochemically bound, and in a nondestructive manner, with the carbon atoms, such as for example sulphonation agents (oleum, sulphone chlorohydrin) or aminating agents (diluted solutions of primary, secondary and tertiary amines and diamines) or organic compounds which contain the desired groups and are capable of reacting by becoming attached to the polymer chains (such as vinylsulphonic acid, acrylic acid, vinylpyridines, vinylpyrrolidone, vinyl acetate and the like), or also compounds which are capable, in their turn, of undergoing a chemical modification after having already been attached, either chemically or radiochemically to the background polymer chain, such as styrene, acrylonitrile and others.

The characteristics of the membranes can be controlled by varying the parameters of the process as indicated by the following Examples.

EXAMPLE 1

8 grams of polyvinylidene fluoride, powdered to a 40-mesh fineness and dried are reacted during 30 minutes at 70° C. with 20%—$SO_3$—oleum. The thus-sulphonated polymer is washed, hydrolyzed with water/30% ethanol to a boil and dried. The powder is then dissolved at 90° C. in 100 mls of anhydrous dimethylformamide. The solution is spread over a chromium-plated steel plate to a thickness of 200 microns and allowed to evaporate for 4 mins. at 25° C. Immediately thereafter, the plate is immersed in water and ice at 0° C. during one hour and then in running water for eight days, an asymmetric membrane being obtained which, introduced in a standard ultrafiltration installation with recycle of the feed (an oily emulsion) has proven to have a separating power towards the mineral oil up to 99.9%, and to the ABS detergents up to 97%, with a permeability of 20,000 liters per square meter under a pressure of 1 kilogram, at a temperature of 45° C. and with an oil concentration of 7%.

EXAMPLE 2

20 grams of powder are treated as in Example 1, a membrane being obtained with 99.9% yield of separation of oil and 98% of ABS detergents, with a permeability of 8,000 liters per sq. meter under the same conditions as in Example 1.

EXAMPLE 3

8 grams of a powder such as in Example 1, but allowing the solution to evaporate during 1 minute only, give a membrane with 99.9% oil retention, 98.5% retention of ABS detergents and a permeability of 9,000 liters per sq. meter, all the other conditions being the same.

EXAMPLE 4

8 grams of powder, when treated as in Example 1, but allowing the solution to evaporate for 8 minutes, produce a membrane with a permeability higher than 30,000 liters per sq. meter, an oil-separation yield of 80%, all the other conditions being the same.

EXAMPLE 5

8 grams of polyvinyl fluoride, when treated as in Example 1, produce a membrane having the 99% oil separation yield, 97% ABS detergent separation and 18,000 liters per sq. meter permeability, all the other conditions being the same.

EXAMPLE 6

8 grams of polyvinylidene fluoride powder as in Example 1, treated under the conditions of Example 1, but allowing the membrane in running water 24 hours only, produce membranes with a permeability of 12,000 liters/sq. meter, 99.9% oil separation yield and 97% ABS detergent separation yield, all the other conditions being the same.

EXAMPLE 7

8 grams of polyvinyl fluoride are dissolved in 60 mls of anhydrous dimethylformamide, at 100° C. To the solution are added, with stirring, 30 mls of anhydrous acetone. The solution is spread on a chromium-plated brass plate to a thickness of 200 microns and allowed to evaporate at 25° C. for 30 mins. Immediately thereafter, the plate is immersed in water and ice at 0° C. for one hour and then in running water for 12 hours, a membrane being thus obtained which, when observed under a microscope, exhibits an asymmetric structure with the denser layer situated on the side away of the plate.

The membrane is then dried for 12 hours in a vacuo at 50° C. and introduced in a vial together with degassed styrene and subjected to radiochemical graft in an inert gas atmosphere by action of gamma rays having an intensity of 300 rad/minute during 7 hours. The membrane is then washed with benzene under reflux conditions for 4 hours and dried at 50° C. in a vacuo, weighed, and exhibits a grafted polystyrene contents as high as 30% by weight.

The membrane is then sulphonated with sulphonic chlorohydrin in carbon tetrachloride for 12 hours at room temperature, an introduction of sulphonic groups as high as 24% by weight being thus achieved.

The membrane is thus ready for use and, tested in a reverse osmosis apparatus working at 70 effective atmospheres and 25° C. with a recycling speed of 1 meter per second has shown to possess a separator power of 70% towards sodium chloride, with a permeability of 800 liters/sq. meter a day, a separator power of 90% sodium sulphate with the same permeability, a separator power of 99% towards copper sulphate, potassium chromate and ABS detergents with a permeability of 450 liters/sq. meter a day.

EXAMPLE 8

15 grams of polymer are treated as in Example 7, a membrane being obtained which has 70% retention towards sodium chloride but 570 liters/sq. meters a day permeability (90% sodium sulphate retention) and a 99% retention of copper sulphate, chromates, detergents, with a permeability of 350 liters/sq. meter a day.

EXAMPLE 9

8 grams of polymer are treated as in Example 7 but allowing the solution to evaporate for two minutes: a membrane is obtained which has a separator power of 20% towards sodium chloride, with a permeability of 2,800 liters/sq. meter a day, retention of 99% towards copper sulphate and chromates and 89% towards ABS detergents, with average permeabilities of 1,200 liters/sq. meter a day.

EXAMPLE 10

8 grams of polymer are treated as in Example 7 but the solution is allowed to evaporate at a temperature of −10° C. and a membrane is obtained which has 80% rejection of sodium chloride and 800 liters/sq. meter a day permeability.

EXAMPLE 11

8 grams of polymer, treated as in Example 7 but grafted to have a 60% polystyrene contents, produce a membrane with 40% sodium chloride rejection and 1,300 liters/sq. meter a day permeability.

EXAMPLE 12

8 grams of polyvinyl fluoride are treated as in Example 7, a membrane being obtained having 72% rejection and 720 liters/sq. meter a day permeability.

EXAMPLE 13

20 grams of polyvinylidene fluoride are powdered to a 40-mesh fineness, dried and are reacted for 30 mins. with 20%—$SO_3$ oleum. The thus sulphonated polymer is washed, hydrolyzed with water/30% ethanol to a boil and dried. The powder is then treated in the same way as disclosed in Example 7 but without grafting any compounds on the polymer. A membrane is obtained which has 10% sodium chloride rejection but a permeability of 7,000 liters/sq. meter a day.

EXAMPLE 14

8 grams of polyvinylidene fluoride are treated as in Example 7, the difference being that the membrane does undergo any compound grafted, but is directly sulphonated with the procedure disclosed in Example 13.

A membrane is obtained which possesses 40% sodium chloride rejection and a permeability of 700 liters/sq. meter a day.

EXAMPLE 15

8 grams of polyvinylidene fluoride are treated as in Example 7, but grafting 50% of 4-vinylpiridine; a membrane is obtained with 80% sodium chloride rejection and 250 liters/sq. meter a day permeability, after a treatment with methyl iodide.

We claim:

1. A method for the preparation of asymmetric membranes, said method comprising the steps of:
    (a) reacting polyvinylidene fluoride or polyvinyl fluoride with 20%—SO$_3$ oleum for a time period sufficient to sulphonate the polymer, said reaction being carried out at about 70° C. for a time period of about 30 minutes;
    (b) dissolving the polymer in dimethylformamide in proportions which vary between about 4% and about 80% by weight per volume of solvent, said dissolution being carried out at about 90° C. and said proportion is between about 8% and about 20% by weight per volume of solvent;
    (c) spreading the thus obtained solution to a thickness of about 10 microns to about 1,000 microns on a plate, said thickness being about 200 microns;
    (d) evaporating the solvent from the solution on the plate for up to about 60 minutes at a temperature in the range of from about −20° C. to about +100° C., said evaporation being carried out for about 1 to about 8 minutes at a temperature of about 25° C.;
    (e) precipitating the asymmetric membrane on the plate with a non-solvent, said asymmetric membrane having a separating power of about 10% towards sodium chloride, up to about 99% towards mineral oil and up to about 98% towards acrylonitrile-butadiene-styrene detergents, with a permeability of between about 7,000 and about 30,000 liters per square meter at a temperature of 45° C., under a pressure of 1 kilgram and with an oil concentration of 7%, said precipitation being carried out by immersing the plate in water and ice at about 0° C. for about 1 hour and then in running water for between about ½ and about 8 days.

2. A method for the preparation of asymmetric membranes, said method comprising the steps of:
    (a) dissolving polyvinyl fluoride in a first solvent, dimethylformamide, in proportions which vary between about 4% and about 80% by weight per volume of solvent, said dissolution being carried out at about 100° C. and said proportion is between about 13.3% and about 25% by weight per volume of solvent;
    (b) adding to the solution of step (a) a second solvent which has a vapor pressure different from that of the first solvent, in a proportion which varies from about 0.2 to about 5 times the original volume of the solution of step (a), said proportion being about 0.5 the original volume of the solution of step (a);
    (c) spreading the solution of step (b) to a thickness of about 10 microns to about 1,000 microns on a plate, said thickness being about 200 microns;
    (d) evaporating the solvents from the solution on the plate for up to about 60 minutes at a temperature in the range of from about −20° C. to about +100° C., said evaporation being carried out between about 2 and about 30 minutes at a temperature between about −10° C. and about 25° C.;
    (e) precipitating the asymmetric membrane on the plate with a non-solvent, said precipitation being carried out by immersing the plate in water and ice at about 0° C. for about 1 hour and then in running water for about 12 hours;
    (f) drying the precipitated asymmetric membrane;
    (g) introducing the dried membrane into a chamber containing a modifying agent selected from the group consisting of vinylsulphonic acid, acrylic acid, vinylpyrridines, vinylpyrrilidone, vinyl acetate, styrene and acrylonitrile, said modifying agent being styrene or vinylpyrridine;
    (h) subjecting said membrane and said modifying agent to gamma rays in an inert atmosphere, for a time period and at an intensity sufficient to graft the modifying agents into the membrane in an amount up to 60% by weight of the membrane, said intensity being about 300 rad/min. and said time period being about 7 hours;
    (j) washing the membrane with a solvent;
    (k) drying said membrane to remove said solvent of step (j);
    (m) reacting said membrane with a sulphonating agent comprised of oleum or sulphone chlorohydrin for a time period sufficient to incorporate sulphonic groups in the membrane in an amount up to 24% by weight, said membrane having a separation power between about 20% and about 80% towards sodium chloride with a permeability between about 570 and about 2,800 liters/sq. meter per day, a separation power between about 90% and about 99% towards sodium sulphate with a permeability between about 570 and about 2,800 liters/sq. meter per day, and a separation power between about 89% and about 99% towards copper sulphate, potassium chromate and acrylonitrile-butadienestyrene detergents with a permeability between about 350 and about 1200 liters/sq. meter per day.

* * * * *